(12) United States Patent
Michalakos et al.

(10) Patent No.: US 7,629,290 B2
(45) Date of Patent: Dec. 8, 2009

(54) LOW-TEMPERATURE OZONE CATALYST

(75) Inventors: Peter M. Michalakos, Chicago, IL (US); Belinda S. Foor, Chicago, IL (US); Robert J. Koukol, Claremont, CA (US); Mariola Proszowski, Des Plaines, IL (US)

(73) Assignee: Honeywell International Inc., Morristown, NJ (US)

( * ) Notice: Subject to any disclaimer, the term of this patent is extended or adjusted under 35 U.S.C. 154(b) by 762 days.

(21) Appl. No.: 11/286,108

(22) Filed: Nov. 23, 2005

(65) Prior Publication Data
US 2006/0084571 A1 Apr. 20, 2006

Related U.S. Application Data

(63) Continuation-in-part of application No. 10/379,456, filed on Mar. 3, 2003, now abandoned.

(51) Int. Cl.
*B01J 23/00* (2006.01)
(52) U.S. Cl. ........................ 502/325; 502/326
(58) Field of Classification Search ................ 502/300, 502/324, 325, 326, 339, 327, 334, 439
See application file for complete search history.

(56) References Cited

U.S. PATENT DOCUMENTS

| | | | |
|---|---|---|---|
| 3,449,176 A | 6/1969 | Klass et al. | |
| 4,200,609 A | 4/1980 | Byrd | |
| 4,206,083 A | 6/1980 | Chang | |
| 4,207,291 A | 6/1980 | Byrd et al. | |
| 4,343,776 A | 8/1982 | Carr et al. | |
| 4,405,507 A | 9/1983 | Carr et al. | |
| 4,551,304 A | 11/1985 | Holter | |
| 4,665,973 A | 5/1987 | Limberg et al. | |
| 4,677,095 A | 6/1987 | Wan et al. | |
| 5,047,381 A * | 9/1991 | Beebe | 502/304 |
| 5,145,822 A | 9/1992 | Falke et al. | |
| 5,232,886 A | 8/1993 | Yoshimoto et al. | |
| 5,422,331 A | 6/1995 | Galligan | |
| 5,620,672 A | 4/1997 | Galligan | |
| 5,997,831 A | 12/1999 | Dettling et al. | |
| 6,121,189 A | 9/2000 | Campbell | |
| 6,203,771 B1 | 3/2001 | Lester et al. | |
| 6,503,462 B1 | 1/2003 | Michalakos et al. | |
| 6,576,199 B1 | 6/2003 | Liu et al. | |
| 2004/0018939 A1 | 1/2004 | Chigapov et al. | |
| 2004/0175313 A1 | 9/2004 | Foor et al. | |

FOREIGN PATENT DOCUMENTS

RU 2 134 157 C1 8/1999
WO WO O/16882 3/2000

* cited by examiner

*Primary Examiner*—Edward M Johnson
(74) *Attorney, Agent, or Firm*—Oral Caglar Esq.

(57) ABSTRACT

The present invention provides an economical and efficient system for the catalytic conversion of ozone, particularly in airplane bleed air. The present invention comprises a washcoat on a single surface layer, wherein the washcoat may contain an active metal oxide which is active for ozone conversion where the metal oxide comprises a transition metal. Alternatively, the system may comprise a refractory metal oxide washcoat into which a transition metal active for ozone conversion is impregnated.

17 Claims, 14 Drawing Sheets

US 7,629,290 B2

LOW-TEMPERATURE OZONE CATALYST

RELATED APPLICATIONS

This application is a continuation-in-part of U.S. patent application Ser. No. 10/379,456 filed Mar. 3, 2003, now abandoned the disclosure of which is hereby incorporated by reference.

BACKGROUND OF THE INVENTION

The present invention generally relates to catalytic converters for reducing the level of pollutants and, more specifically, to a catalytic converter for destroying ozone.

Environmental control systems for aircraft supply pressurized and conditioned air to the aircraft cabin. The temperature, pressure, and relative humidity must be controlled to provide for the comfort of flight crew and passengers within the aircraft. Typically, environmental control systems receive compressed air, such as bleed air from a compressor stage of an aircraft gas turbine engine, expand the compressed air in a cooling turbine, and remove moisture from the compressed air through a water extractor.

Toxic ozone in the compressed air can become an issue when aircraft cruise at altitudes that exceed 20,000 feet. Modern jet aircraft are typically designed for fuel-efficient operation at relatively high altitudes of 25,000 feet or more above sea level. At these altitudes, the ozone content in ambient air is relatively high and, thus, the air supplied to the aircraft environmental control system can contain a substantial amount of ozone. Air containing ozone can cause lung and eye irritation, headaches, fatigue, and breathing discomfort. Because of these dangers, the Federal Aviation Administration (FAA) requires that ozone levels in airplane cabin air be maintained below specified limits.

It is known within the art to utilize catalytic converters to reduce or eliminate ozone in the air supplied to the aircraft cabin. There are a number of desirable characteristics for an ozone destroying catalytic converter of an aircraft. These characteristics include a) high efficiency of ozone conversion at bleed air operating temperature; b) good poison resistance from humidity, sulfur compounds, oil, dust, and the like, which may be present in the compressed air (for long life and minimum system overhaul and maintenance costs); c) light weight to minimize system parasitic load; d) high structural integrity of catalyst support under extreme heat or vibration shock, which may arise during normal flight conditions (also for long life and minimum system overhaul and maintenance costs); and e) high mass transport efficiency with low pressure drop.

Known within the art are ceramic monolith supports which carry a catalyst on a washcoat applied to their surfaces. For example, U.S. Pat. No. 4,405,507 discloses aluminum honeycomb treated with NaOH. U.S. Pat. No. 5,145,822 discloses catalysts attached by an elastic organic adhesive to a metal foil support. U.S. Pat. No. 6,203,771 discloses a catalytic converter with active metals supported directly on an anodized surface layer to remove ozone. However, none disclose the use of the washcoat to destroy ozone.

In some aircraft, the pressurized air supplied to the cockpit and passenger cabins is supplied by dedicated compressors. The air may contain the same amount of ozone as bleed air, but the temperature of this air may be lower than bleed air. At lower temperatures, the ozone removal efficiency of conventional catalytic converters decreases with time. Several formulations have successfully addressed this issue using precious metals and multiple preparation steps. However, this makes producing the catalytic converters expensive.

Moreover, the catalytic converters of the prior art do not utilize the washcoat to destroy ozone. It would be desirable to provide a system and method that uses the support (washcoat) to destroy ozone, rather than merely providing surface area support for a catalyst.

As can be seen, there is a need for an inexpensive catalyst for catalytic converters that destroy ozone. It would also be desirable for such a catalyst to have a low-temperature ozone removal efficiency that has a minimum decay over time, may be easily integrated with existing airplane bleed air systems, has low weight and low pressure drop, and reduces impact on existing environmental control systems and the plane's fuel consumption.

SUMMARY OF THE INVENTION

The present invention provides catalytic systems that economically and efficiently destroy ozone, particularly within an airplane bleed system. In one aspect of the present invention there is provided an ozone destroying system comprising a core and an active metal oxide washcoat applied to said core that destroys ozone, said active metal oxide washcoat comprises an oxide of a metal wherein the metal is, copper, iron, cobalt, nickel or combinations thereof.

In another aspect of the present invention there is provided an ozone destroying system consisting of a core and an active metal oxide washcoat applied to said core that destroys ozone. The metal oxide washcoat may comprise an oxide of metal wherein the metal may be manganese, copper, iron, cobalt, nickel or combinations thereof.

In a further aspect of the present invention there is provided an ozone destroying system comprising a core; a refractory metal oxide washcoat applied to said core; and an active metal impregnated in said washcoat layer, wherein said active metal is a transition metal and wherein said active metal destroys ozone.

The present invention also provides a method and system that simultaneously destroys ozone and hydrocarbons within an airplane bleed air system. Because the system described herein combines both the objectives of destroying ozone and hydrocarbons within a single system, it is efficient, effective, reduces a plane's fuel consumption because it has lower weight than two systems, reduces impact on existing environmental control systems because it has lower pressure drop than two systems, and may be easily integrated with existing airplane bleed air systems.

In one aspect of the present invention, an ozone and hydrocarbon destroying system for an environmental control system of an aircraft is disclosed. This catalytic converter may comprise a core, an active metal oxide washcoat applied to the core for destroying ozone, and an active metal impregnated in the washcoat layer for destroying hydrocarbons.

In yet another aspect of the present invention, an ozone and hydrocarbon destroying system for an environmental control system of an aircraft comprises a metal core, a surface layer formed from a portion of the core by mechanical, chemical, electrochemical, or thermal means, an active metal oxide washcoat for destroying ozone and containing manganese oxide or cobalt oxide applied to the surface layer, and an active metal, being platinum, impregnated in the active metal oxide washcoat for destroying hydrocarbons.

In a still further aspect of the present invention, an ozone and hydrocarbon destroying system for an environmental control system of an aircraft comprises an aluminum core with a plurality of fins; an aluminum oxide anodized surface layer formed from a portion of the core; an active metal oxide washcoat containing manganese oxide or cobalt oxide that destroys ozone applied to the anodized surface layer; and an active metal impregnated in the active metal oxide washcoat that destroys hydrocarbons, wherein the active metal is platinum, and is loaded at 0.5-15% by weight of the manganese or cobalt oxide.

In another aspect of the present invention, an ozone and hydrocarbon destroying system for an environmental control system of an aircraft comprises a core, a high surface area refractory metal oxide washcoat applied to the core, a first active metal impregnated into said washcoat for destroying ozone, and a second active metal, also impregnated in the washcoat for destroying hydrocarbons.

In yet another aspect of the present invention, an ozone and hydrocarbon destroying system for an environmental control system of an aircraft comprises a core, a surface layer formed from a portion of the core by mechanical, chemical, electrochemical, or thermal means, a high surface area refractory metal oxide washcoat applied to the surface layer, a first active metal impregnated into said washcoat that destroys ozone, wherein said first active metal is manganese oxide or cobalt oxide and a second active metal impregnated into said washcoat that destroys hydrocarbons, wherein said second active metal is platinum In a still further aspect of the present invention, an ozone and hydrocarbon destroying system for an environmental control system of an aircraft comprises an aluminum core with a plurality of fins; an aluminum oxide anodized surface layer formed from a portion of the core; a high surface area refractory metal oxide washcoat applied to the anodized surface layer, a first active metal impregnated in said washcoat that destroys ozone, wherein said first active metal is manganese or cobalt; and a second active metal impregnated in the washcoat that destroys hydrocarbons, wherein the second active metal is platinum and is loaded at 0.5-15% by weight of the washcoat.

In a further aspect of the present invention, a method of preparing a core, so as to provide a combined hydrocarbon-destroying and ozone-destroying converter for an airplane bleed system is disclosed comprising: treating the converter core with an active metal oxide washcoat that has a high efficiency for the removal of ozone; and impregnating the washcoat with an active metal, wherein the active metal has a high efficiency for the conversion of hydrocarbons to carbon dioxide and water.

In still another aspect of the present invention, a method of treating a catalytic converter core, so as to provide a combined hydrocarbon-destroying and ozone-destroying converter for an airplane bleed system is disclosed comprising: coating the converter core with a washcoat, wherein the washcoat contains a high-surface area refractory metal oxide; drying and calcining said washcoated core; impregnating the washcoat with a salt of a first active metal and a salt of a second active metal; and drying and calcining the impregnated and washcoated core.

In yet another aspect of the present invention, a method of destroying ozone and hydrocarbons in airplane bleed air is disclosed comprising: passing ozone and hydrocarbon containing air through a catalytic converter, wherein the catalytic converter contains a core selected from the group consisting of a ceramic monolith, a metal monolith composed of straight channels, a metal monolith composed of a plurality of fins enclosed by a shell, or layers of fins stacked in an alternating manner to form a heat exchanger; a washcoat on said core that contains a first active metal that has a high efficiency for the removal of ozone, and that contains a second active metal that has a high efficiency for the conversion of hydrocarbons to carbon dioxide and water.

These and other features, aspects and advantages of the present invention will become better understood with reference to the following drawings, description and claims.

DETAILED DESCRIPTION OF THE INVENTION

Figure 1A:
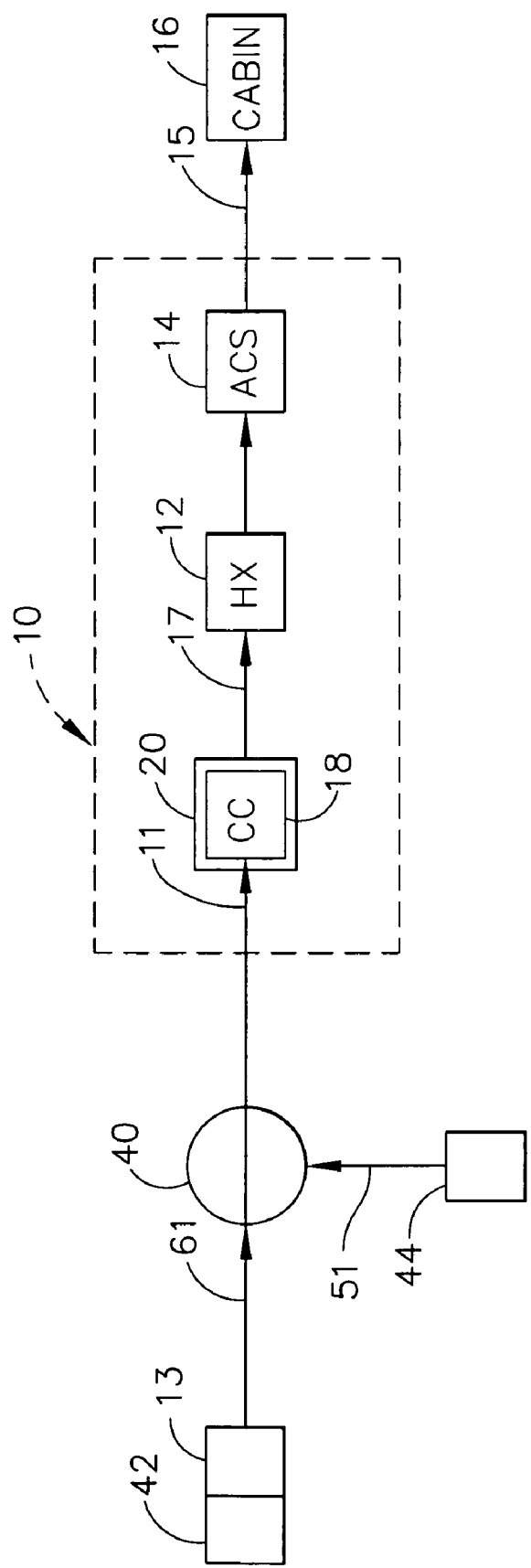
FIG. 1A depicts a schematic aircraft environmental control system according to the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention is particularly useful within an aircraft environmental control system ("ECS"). However, the present invention is not intended to be so limited. Previously, in an ECS, ozone could be destroyed using one method or system, and hydrocarbons destroyed according to another method or system. As such this was inefficient and costly, requiring two separate systems and methods for their use. The present invention provides a method and system that simultaneously destroys hydrocarbons and ozone. In applications where only ozone need be destroyed, the present invention provides an economical and efficient system that may use transition metals as the catalyst.

In FIG. 1, an ECS 10 may receive compressed air 11 such as bleed air 61 from a compressor section of the aircraft's main engine 42, or bleed air 51 from an auxiliary power unit (APU) 44. A valve 40 selects whether the compressed air 11 is supplied by the main engine 42 or the APU 44. Typically, during ground operations APU bleed air 51 is selected. During flight, main engine bleed 61 is selected. Alternatively, air 11 may be supplied by a dedicated air compressor both in flight and on ground.

The bleed air may be at a flow between 1 and 250 lbs air flow/min. The ECS 10 may include a catalytic converter 18, which may be located in the belly of the aircraft, between the source of the compressed air 11 and the air conditioning system ("ACS") 14. The catalytic converter 18 may be mounted inside a shell 20 through which the compressed air 11 flows. The compressed air 11 passes through the catalytic converter 18, which may simultaneously destroy both ozone and hydrocarbons in the compressed air. Filtered air 17 exits the converter 18 and may pass through at least one air-to-air heat exchanger 12 before entering the ACS 14. The ACS 14 may include an air cycle machine and a water extractor for cooling the compressed air 17 to a desired temperature and reducing moisture to a desired level. The ECS 10 may supply cooled, conditioned air 15 to a cabin 16 or other compartment of the aircraft.

A pre-cooler 13 may be located upstream from the catalytic converter 18, in-between the main engine 42 and valve 40. The pre-cooler 13 lowers the temperature of the compressed air from the main engine 42 prior to ozone destruction and conversion of hydrocarbons. The washcoat and catalyst may optionally be applied to the pre-cooler 13 for the simultaneous destruction of hydrocarbons and ozone. In this case, a separate core is not needed. Anodization may or may not be employed depending upon the material of construction of the pre-cooler.

Figure 2:
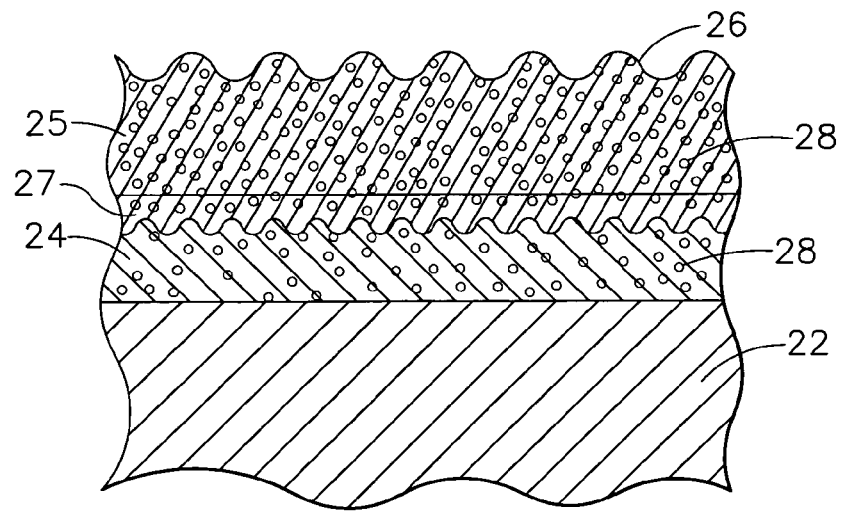
FIG. 2 depicts a cross sectional cutaway view of a portion of a catalytic converter according to the present invention.

FIG. 2 illustrates a cross-section of a surface of a portion of the catalytic converter 18. The catalytic converter 18 may include a core 22, which in the preferred embodiment consists of an aluminum substrate, an anodized surface layer 24 formed from a portion of the core, a washcoat layer 26 with a first active metal 28 impregnated in the washcoat layer 26, and a second active metal 25 impregnated in the washcoat layer 26 containing the first active metal 28. The core 22 described throughout may be a heat exchanger.

The anodized core 24 provides a support for washcoat layer 26. The anodized surface layer 24 may have a thickness between about 2.0 to 10.0 microns, for example. The anodized surface layer 24 may be dense at the interface with the core 22. It may also have a rough surface at the interface with the washcoat layer 26.

The first active metal and second active metal may be impregnated both in the washcoat layer 26 and the anodized surface layer 24. Concentration of both the first active metal 28 and the second active metal 25 in the washcoat layer 26 may be higher than the concentration in the anodized surface layer 24. The washcoat layer 26 is a refractory metal oxide such as alumina, silica, titania, zirconia, or combinations thereof. The first active metal 28 may be selected from the group consisting of manganese, palladium, copper, silver, iron, cobalt and nickel or any combination thereof. According to a preferred embodiment, the first active metal is either cobalt or manganese, and may be present at weights less than or equal to the washcoat weight. The second active metal 25 may be selected from the group consisting of platinum, gold, iridium, rhodium, manganese, copper, iron, nickel or any combination thereof. According to a preferred embodiment, the second active metal may be platinum and may be loaded at 0.5-15% by weight of the washcoat. The first active metal 28 and second active metal 25 will act as catalysts to simultaneously destroy ozone and hydrocarbons, respectively.

Alternatively, an ozone destroying system may comprise the first active metal 28 impregnated into the washcoat layer 26, but not the second active metal 25. The washcoat layer 26 may be a refractory metal oxide such as alumina, silica, titania, zirconia, or combinations thereof. When an anodized surface layer 24 is present, the first active metal 28 may be impregnated into both the washcoat layer 26 and the anodized surface layer 24. Concentration of the first active metal 28 in the washcoat layer 26 may be higher than the concentration of the first active metal 28 in the anodized surface layer 24. In an exemplary embodiment, the first active metal 28 has a concentration of up to 100% by weight of the washcoat layer 26. In another exemplary embodiment, the first active metal 28 has a concentration of up to about 150% by weight of the washcoat layer 26. The first active metal 28 may be manganese, palladium, copper, silver, iron, cobalt and nickel or any combination thereof. In one exemplary embodiment, the first active metal 28 is a transition metal, such as, but not limited to, manganese, cobalt, iron, copper, nickel or combinations thereof. In another exemplary embodiment, the first active metal 28 is cobalt, manganese or combinations thereof.

Figure 7A:
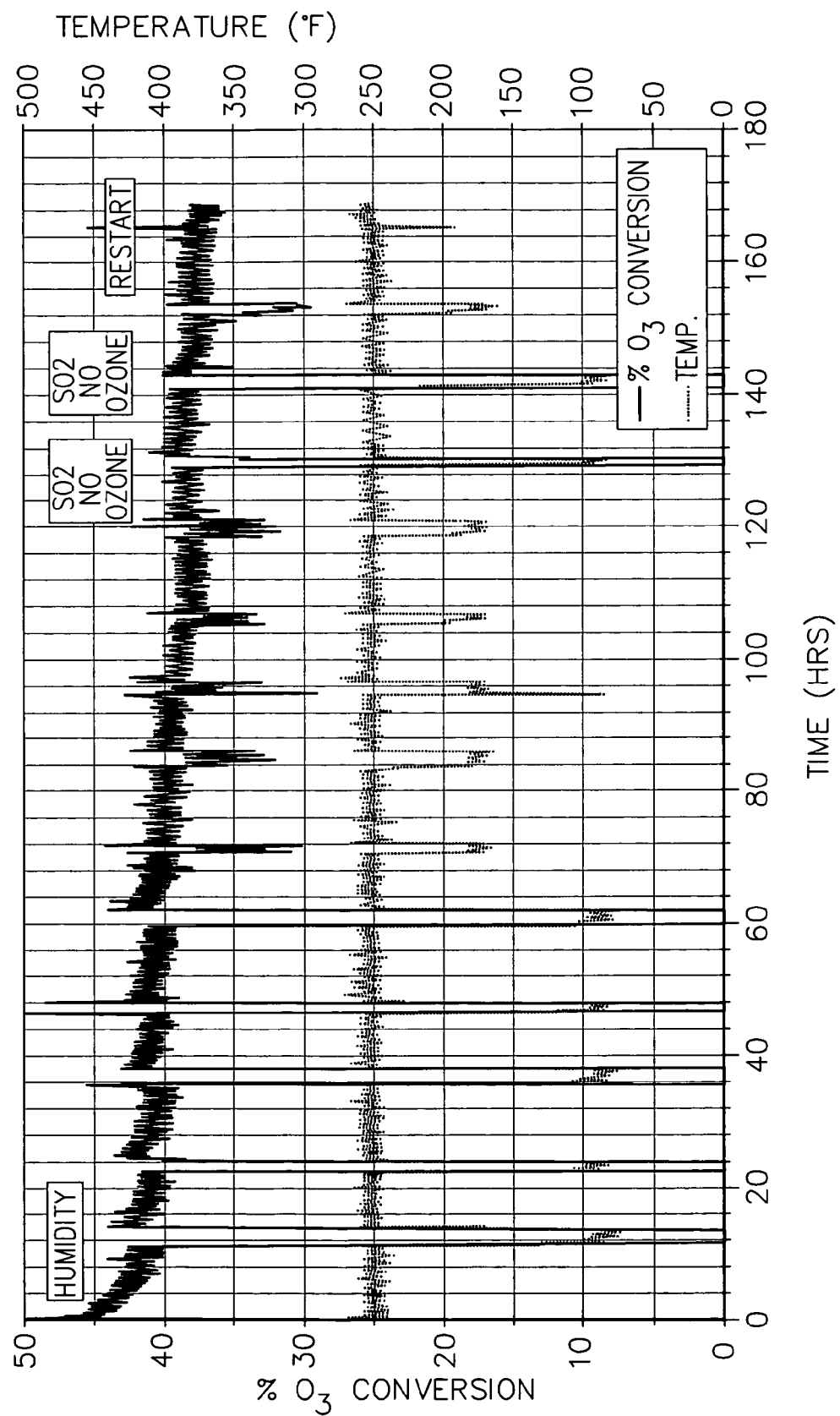
FIG. 7A is a graph showing the durability of a catalytic converter having a refractory metal oxide washcoat impregnated with cobalt, according to the invention.

A comparison of the durability, efficiency and stability of a system comprising only the first active metal 28 impregnated into the washcoat layer 26 was compared to that of a system having both the first active metal 28 and the second active metal 25 impregnated into the washcoat layer 26. The durability of a system comprising cobalt impregnated into washcoat layer 26 is shown in FIG. 7A compared to a system having cobalt and platinum impregnated into the washcoat layer 26 in FIG. 7C. Durability is determined by testing the catalysts in three cycles that simulate exposure to different altitudes, ground conditions, and 12,000 flight hours worth of sulfur exposure and comparing the efficiencies after the three cycles to the initial efficiencies. Within the statistical certainty, the cobalt impregnated into washcoat layer 26 had a similar durability after the three cycles as did the cobalt/platinum impregnated washcoat layer 26.

Figure 8A:
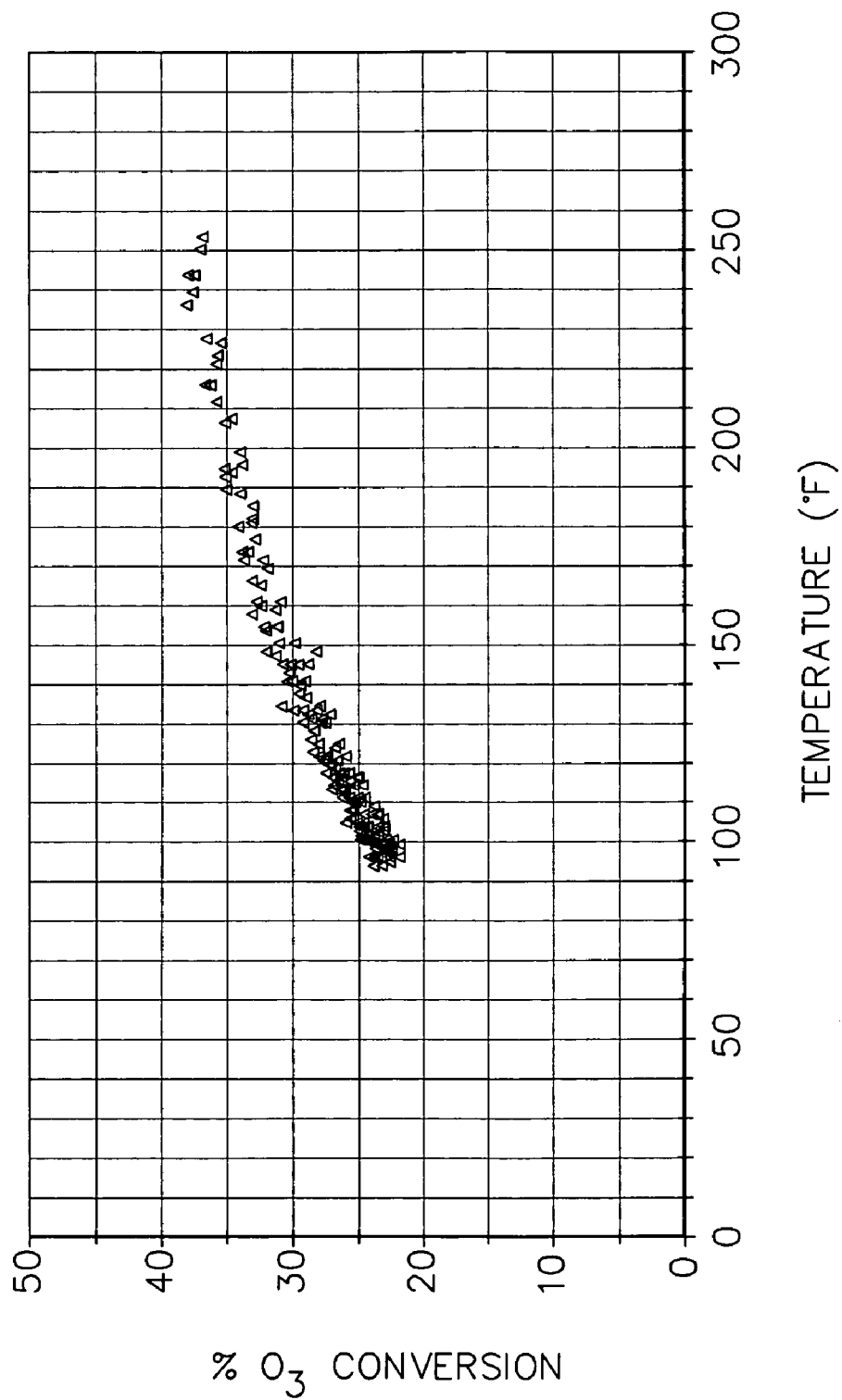
FIG. 8A is a graph showing the efficiency of a catalytic converter having a refractory metal oxide washcoat impregnated with cobalt as a function of temperature, according to the invention.
Figure 8B:
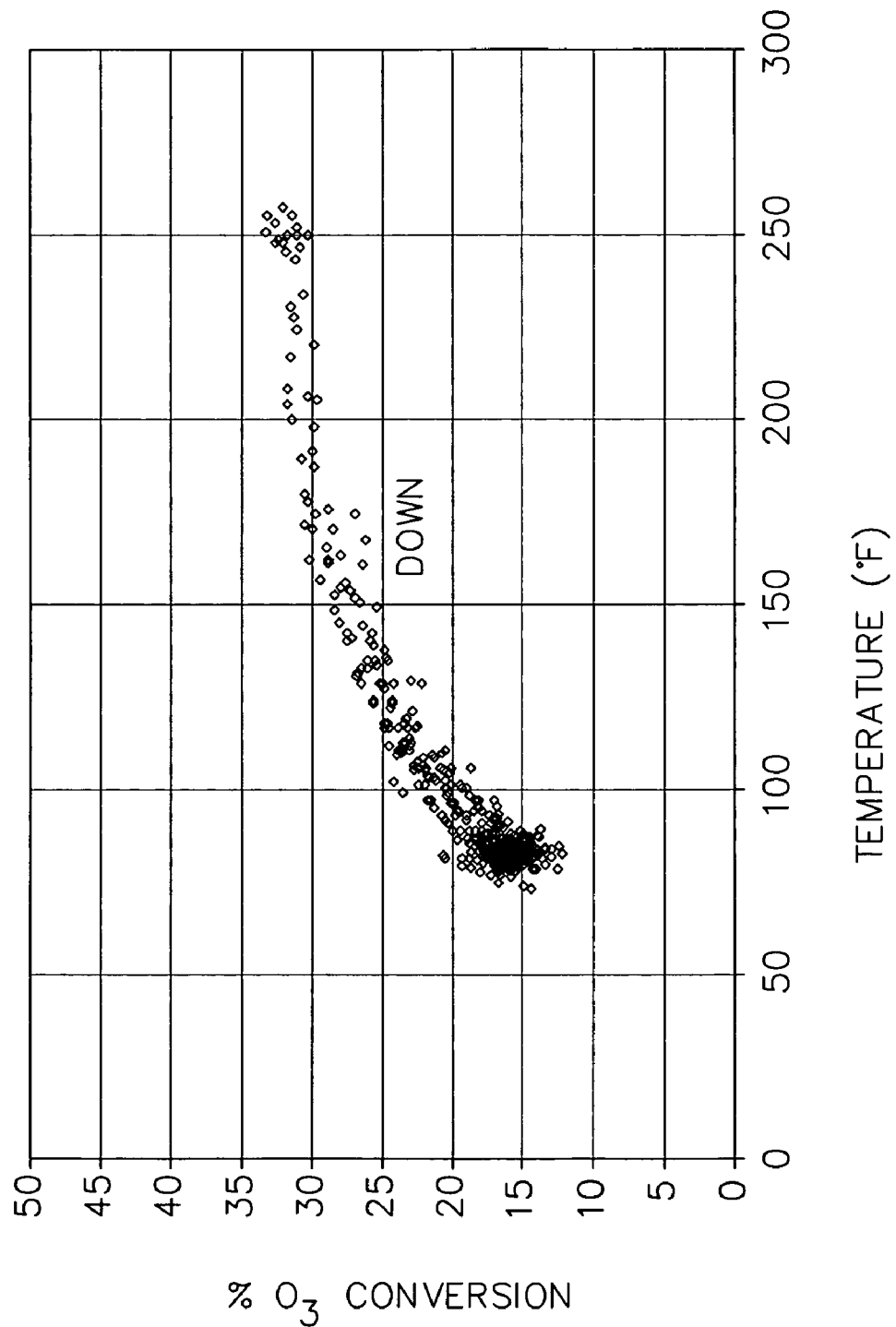
FIG. 8B is a graph showing the efficiency of a catalytic converter having an active cobalt oxide washcoat as a function of temperature, according to the invention.
Figure 8C:
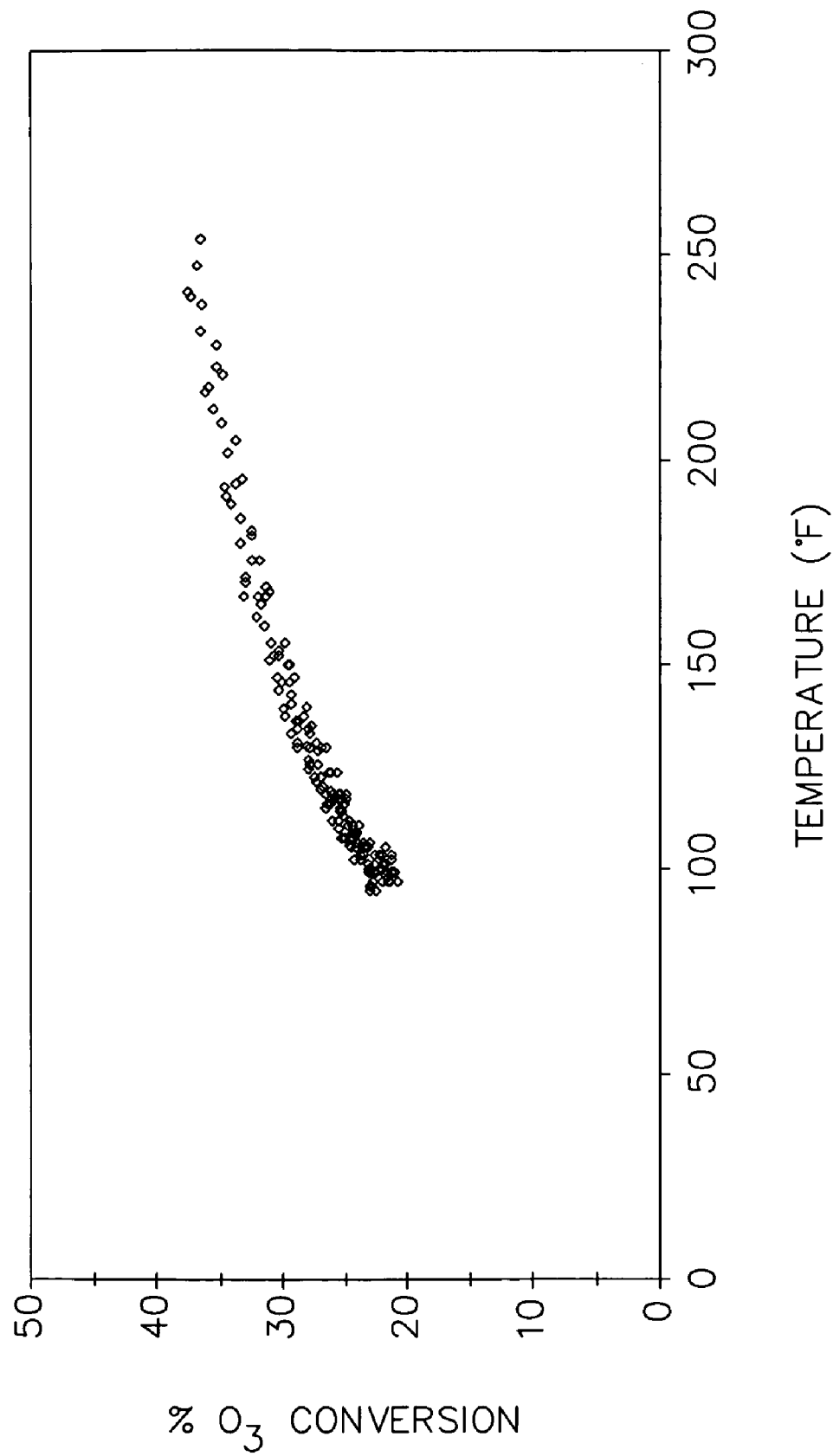
FIG. 8C is a graph showing the efficiency of a catalytic converter having a refractory metal oxide washcoat impregnated with platinum and cobalt as a function of temperature, according to the invention.
Figure 9A:
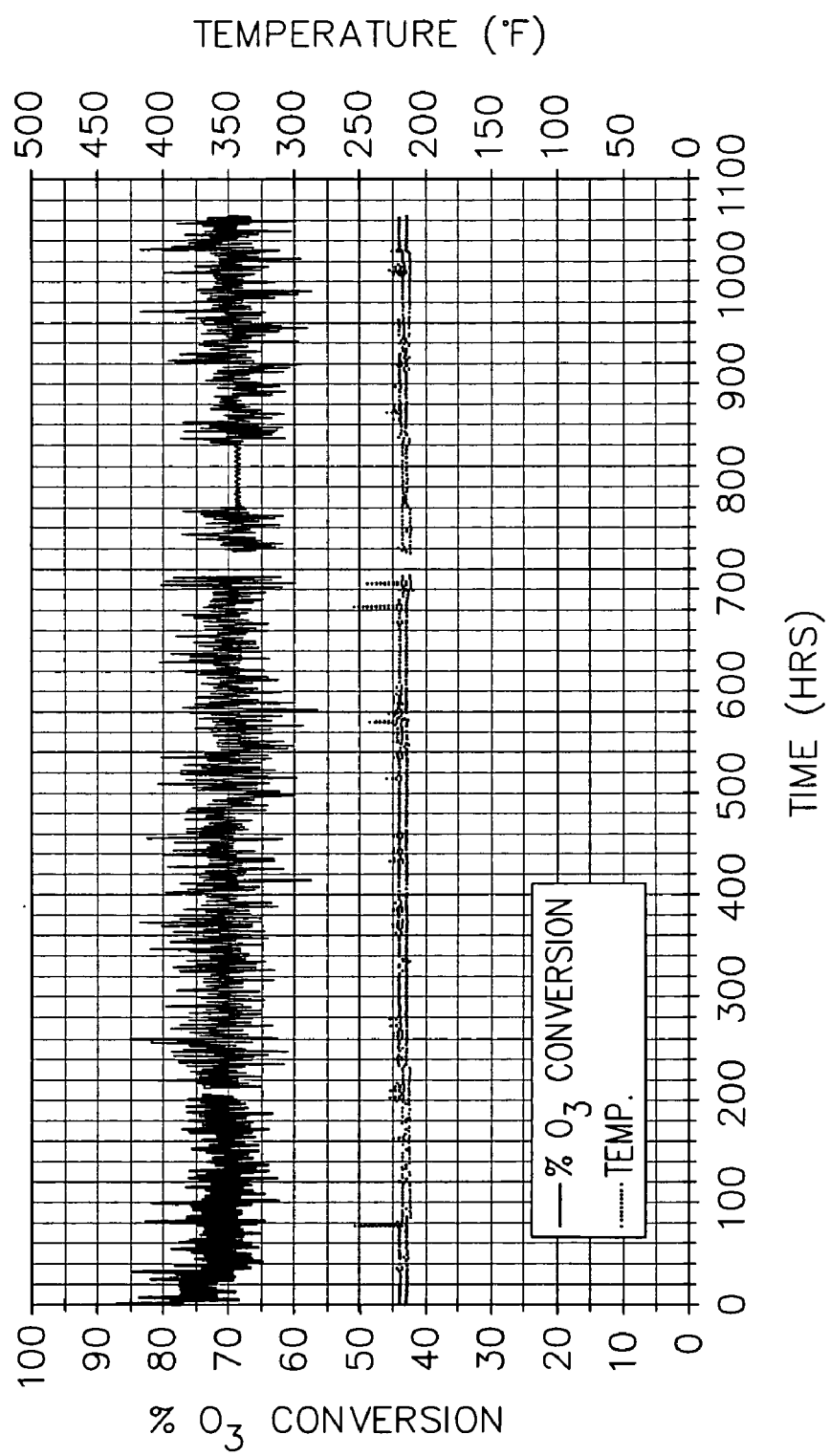
FIG. 9A is a graph showing the long term stability of the efficiency of a catalytic converter having a refractory metal oxide washcoat impregnated with cobalt, according to the invention.
Figure 9B:
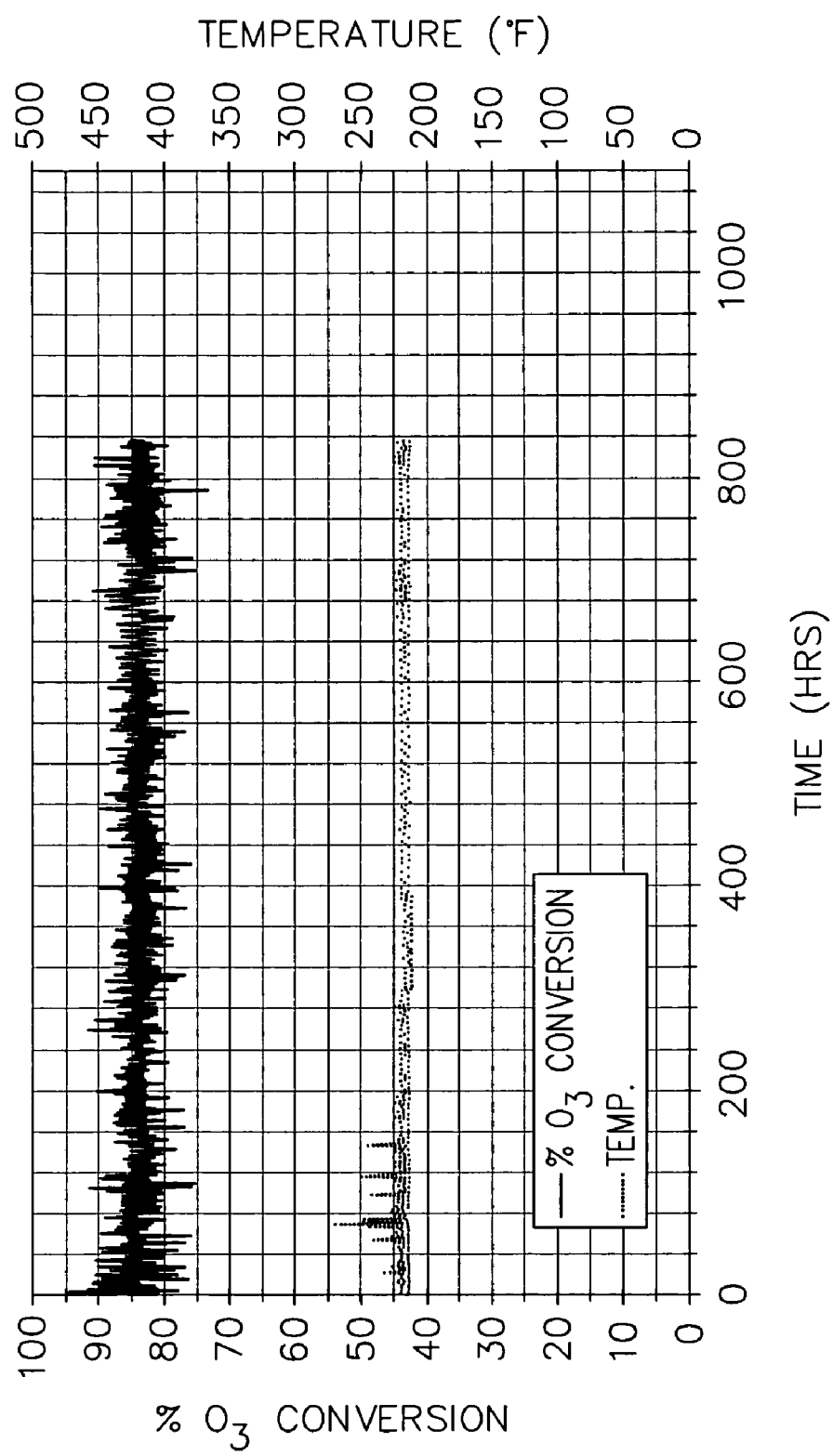
FIG. 9B is a graph showing the long term stability of the efficiency of a catalytic converter having an active cobalt oxide washcoat, according to the invention.
Figure 9C:
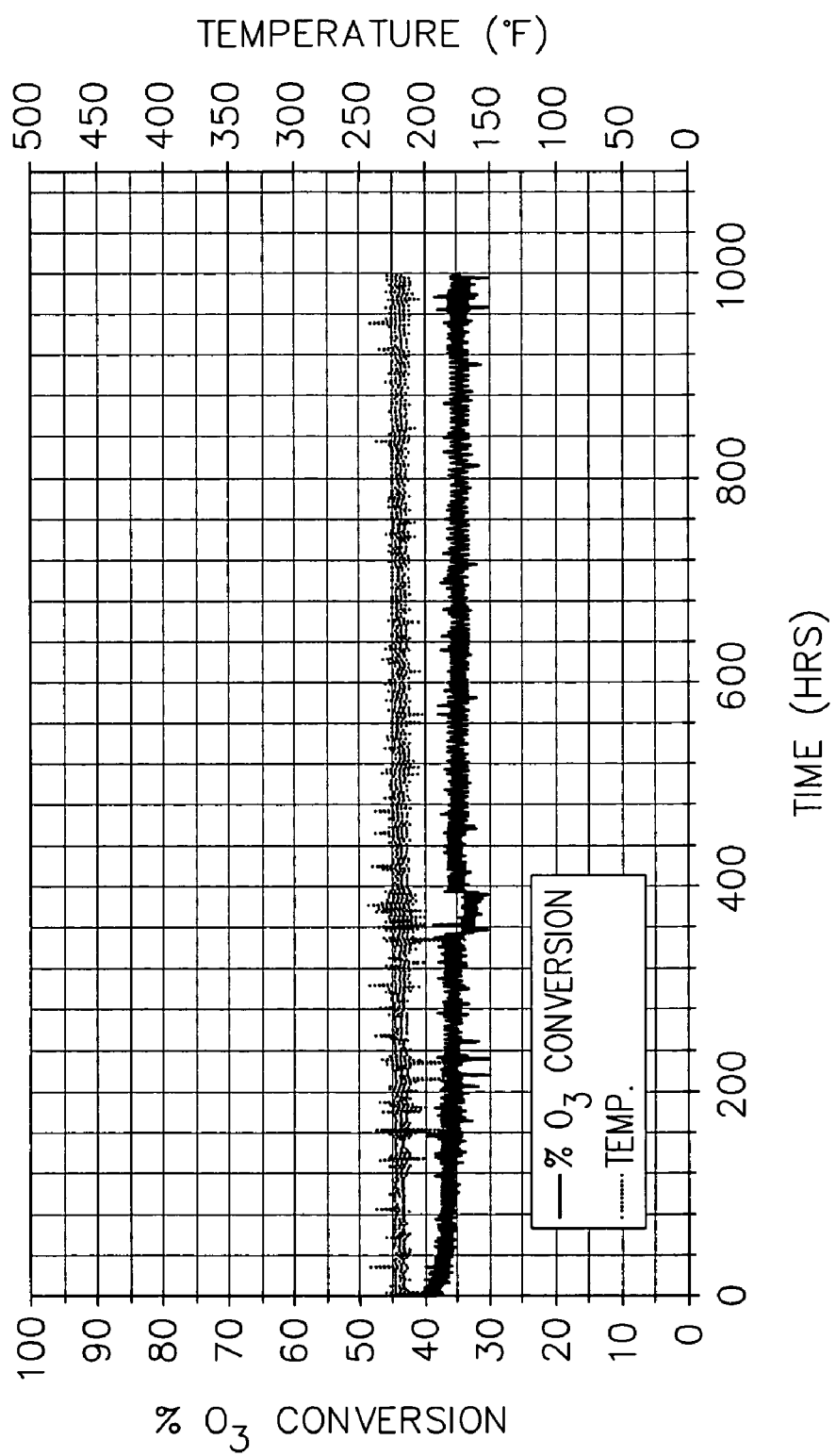
FIG. 9C is a graph showing the long term stability of the efficiency of a catalytic converter having a refractory metal oxide washcoat impregnated with platinum and cobalt, according to the invention.

The cobalt impregnated into washcoat layer 26 also had a similar efficiency as a function of temperature as the cobalt/platinum impregnated washcoat layer 26 as shown in FIGS. 8A and 8C, respectively. Finally, the long term stability of the cobalt impregnated into washcoat layer 26 had a similar durability as the cobalt/platinum impregnated washcoat layer 26 as shown in FIGS. 9A and 9C, respectively. Durability was assessed as percent change of efficiency over 1000 hours in an ozone/air atmosphere at 218° F.

When a stream of compressed air 11 containing ozone and hydrocarbons is directed across the catalytic converter 18, the ozone containing compressed air 11 interacts with the first active metal 28 within the washcoat layer 26 to decompose a majority of the ozone through the reaction $2O_3 \rightarrow 3O_2$.

The compressed air 11 may contain hydrocarbons. The hydrocarbons can interact with the second active metal 25 to decompose the hydrocarbons into carbon dioxide and water. This results in a filtered air stream 17 flowing past the converter 18 to the ACS 12.

The anodized surface layer 24 may be formed through electrochemical transformation of the surface of the core 22. Anodizing is an electrolytic oxidation process, which has been used to provide a surface coating on aluminum for protection or decoration of the aluminum or to create a porous layer, which can be used as a catalyst support. The process generally involves establishing an electrolytic cell with the aluminum structure as the anode. Passing an electric current through the aluminum oxidizes the surface to an adherent aluminum oxide. Because the anodized surface layer 24 is an integral part of the core 22, the anodized surface layer 24 significantly improves the binding strength between the core 22 and the washcoat layer 26.

The binding strength may be further enhanced through chemical cross-linking between the metal oxide of the anodized surface and a resin (e.g., an organosiloxane resin) during washcoat formation. Therefore, the washcoat layer 26 has a strong adhesion to the anodized surface layer 24 and may be semi-flexible in the event the core 22 deforms. As a result, the anodized surface layer 24 lessens the likelihood that the washcoat layer 26 will flake off when the catalytic converter 18 is subjected to high temperatures, large temperature swings, and strong vibrations during normal flight conditions.

The washcoat layer 26 according to another embodiment of the present invention may contain oxides of the said first active metal 28 such as cobalt or manganese, palladium, nickel, iron, copper or silver, so that the washcoat 26 itself may destroy ozone contained within a compressed air stream. For example, the washcoat may be manganese or cobalt oxide instead of a refractory metal oxide. The active metal oxide washcoat is impregnated with the aforementioned second active metal or combination of metals as described supra. When an active metal oxide washcoat is used, it may be desirable to provide further adhesion though the application of an underlayer 27 prior to the washcoat. The underlayer 27 may be between the anodized surface layer 24 and the washcoat layer 26.

Alternatively, an ozone destroying system may comprise the active metal oxide washcoat layer 26 without the impregnation of the second active metal 25. The active metal oxide washcoat may comprise a metal of an oxide, wherein the metal may be a transition metal capable of catalyzing the destruction of ozone. Examples of such a transition metal may be, but not limited to, manganese, cobalt, iron, copper, nickel or combinations thereof. In an exemplary embodiment, the active metal oxide washcoat may comprise manganese oxide, cobalt oxide, or mixtures thereof. By using a transition metal alone, the ozone destroying system may be economical as compared to alternative systems that employ precious metals.

Figure 7B:
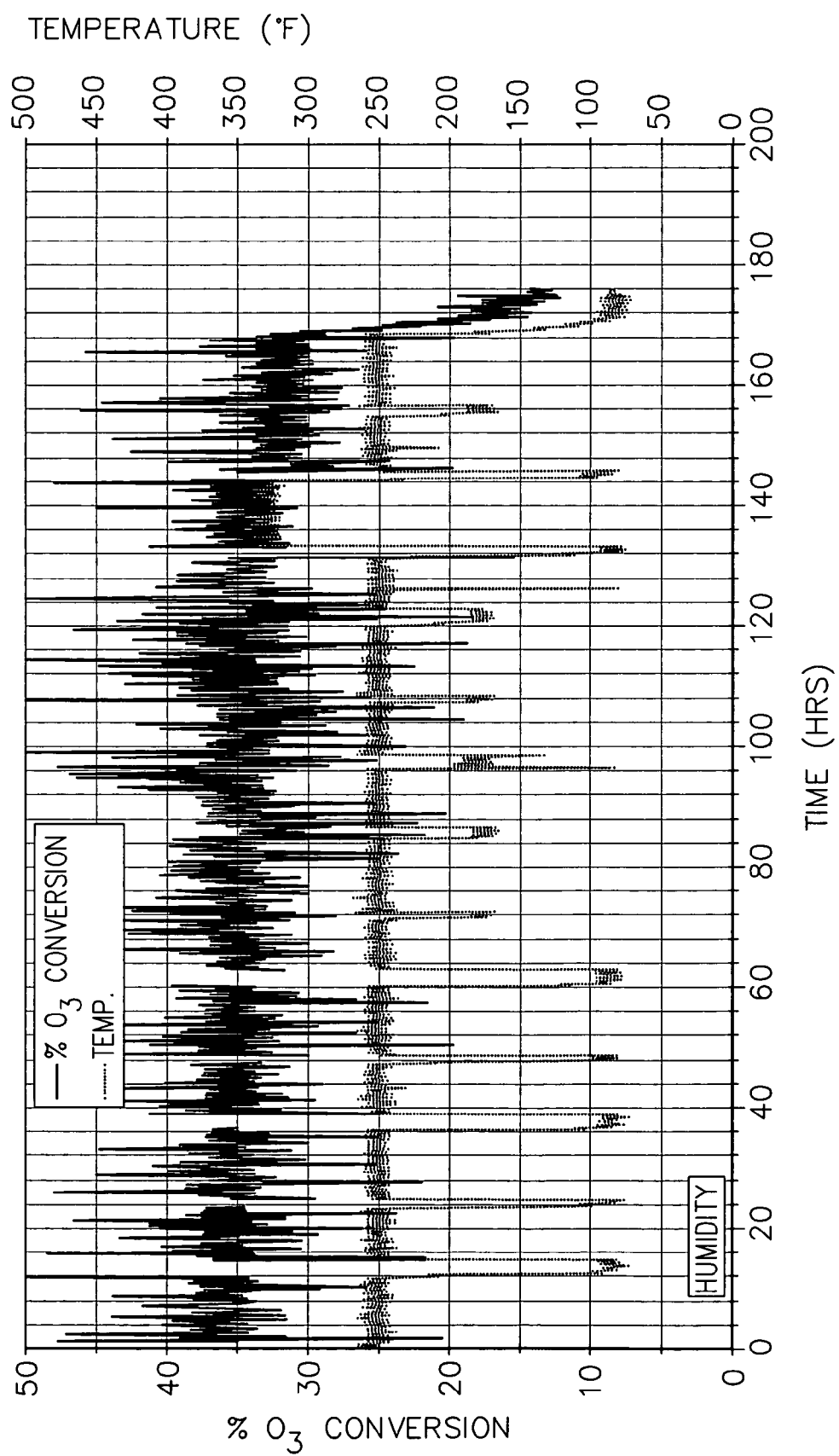
FIG. 7B is a graph showing the durability of a catalytic converter having an active cobalt oxide washcoat, according to the invention.
Figure 7C:
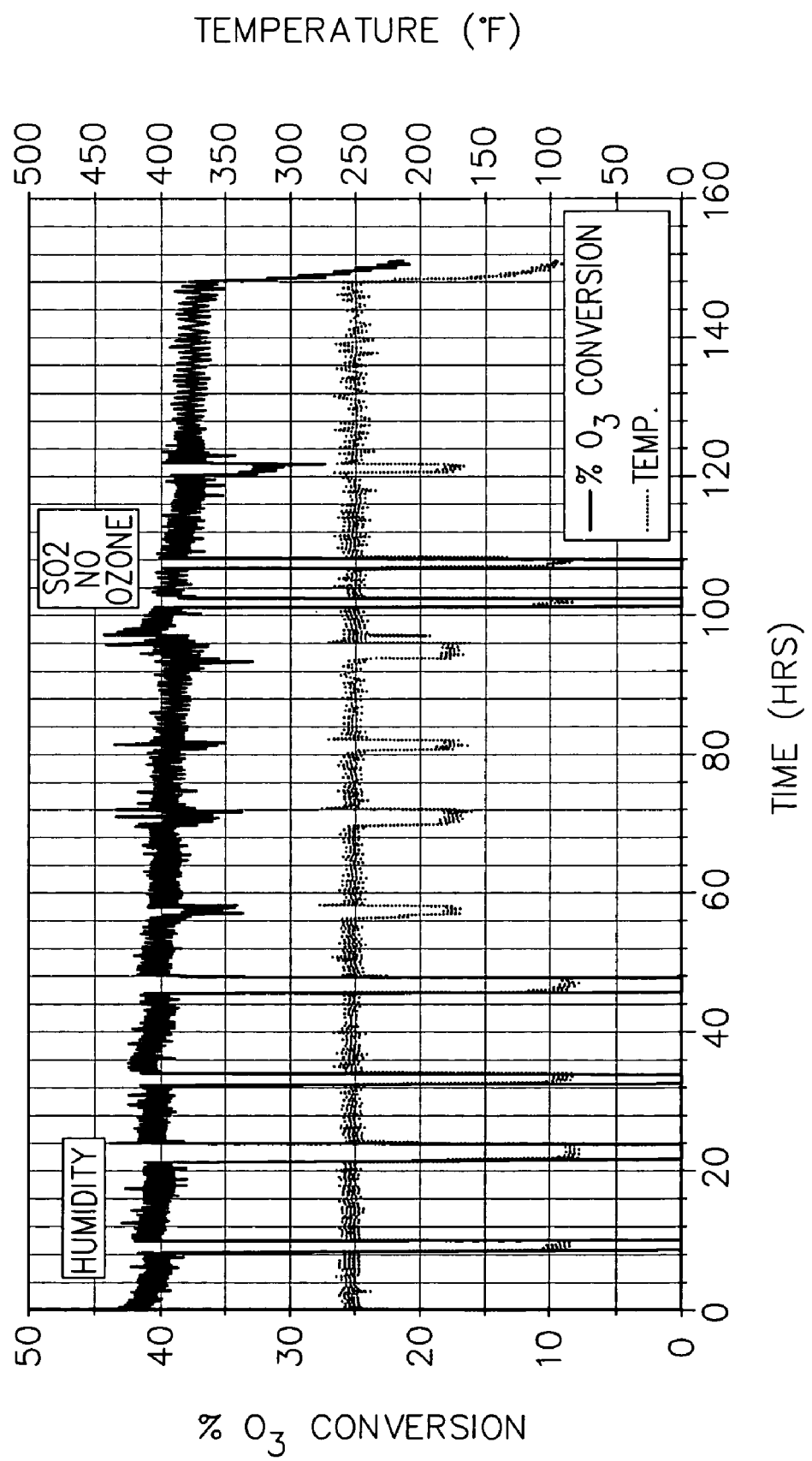
FIG. 7C is a graph showing the durability of a catalytic converter having a refractory metal oxide washcoat impregnated with platinum and cobalt, according to the invention.

A comparison of the durability, efficiency and stability of the active metal oxide washcoat of the present invention was compared to that of a system having a transition metal and a precious metal impregnated into a refractory metal oxide washcoat. The durability of an active metal oxide washcoat comprising cobalt oxide is shown in FIG. 7B compared to a refractory metal oxide washcoat having cobalt and platinum impregnated into the washcoat in FIG. 7C. Durability is determined by testing the catalysts in three cycles that simulate exposure to different altitudes, ground conditions, and 12,000 flight hours worth of sulfur exposure and comparing the efficiencies, as measured by ozone conversion, after the three cycles to the initial efficiencies. Within the statistical certainty, the cobalt oxide active metal washcoat layer had a similar durability after the three cycles as did the cobalt/platinum impregnated washcoat layer.

The active cobalt oxide washcoat layer also had a similar efficiency as a function of temperature as the cobalt/platinum impregnated washcoat layer as shown in FIGS. 8B and 8C, respectively. Finally, the long term stability of the active cobalt oxide washcoat layer had a similar durability as the cobalt/platinum impregnated washcoat layer as shown in FIGS. 9B and 9C, respectively. Durability was assessed as percent change of efficiency over 1000 hours in an ozone/air atmosphere at 218° F.

The core 22 may also be made of titanium, stainless steel, inconel, nickel alloy, cordierite, silicon nitride, alpha aluminum oxide, or other ceramic composite materials. If the core 22 is formed of metal (other than aluminum), treatment of the surface by thermal, chemical, or mechanical means may be used to increase the adhesion of the washcoat. For example, a thin oxide layer may be formed on the surface of the core 22 by heating in air prior to application of the washcoat 26. Or, the surface may be etched by strong base or acid. Alternatively, the surface may be mechanically roughened.

Figure 3:
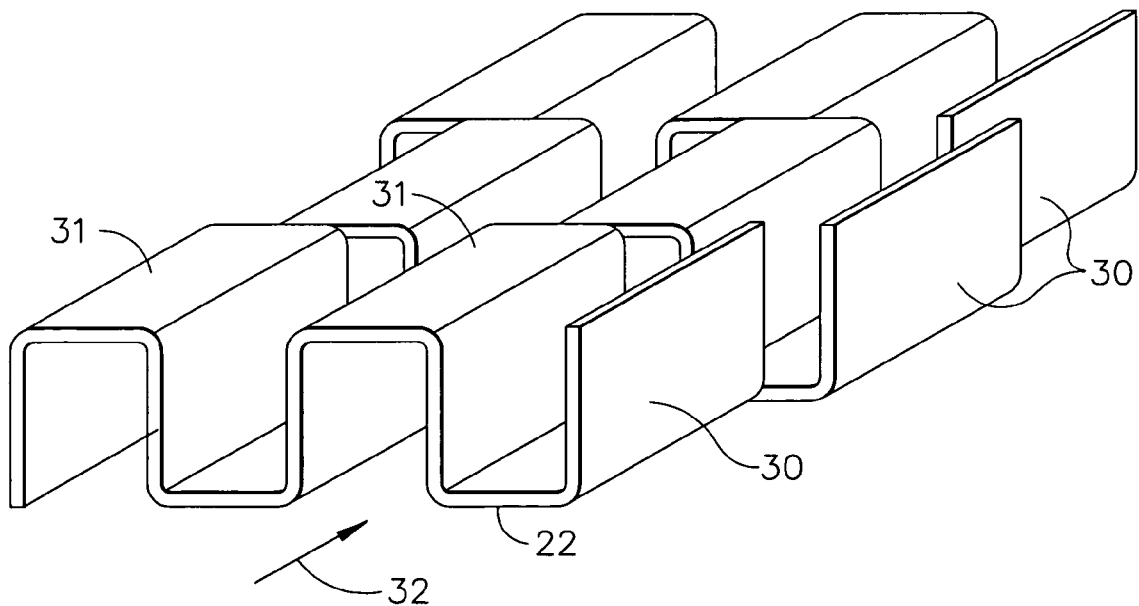
FIG. 3 is a perspective view illustrating a portion of a plate-fin element having a succession of offset fin rows according to the present invention.

It is also well known that many core geometries may be utilized to support catalyst compositions thereon. The core may be a straight-channel ceramic monolith, or straight-channel metal monolith, or may be a metal core 22 composed of a plurality of fins 31, as shown in FIG. 3.

A monolith is a substrate body having a plurality of fine, parallel gas flow channels extending through the body. Such substrates may be extruded from ceramic-like compositions such as cordierite or other similar highly refractory materials. A disadvantage of using a straight-channel monolith as a catalyst core is the mass transfer limitation that occurs throughout most of the channel length. Near the channel entrance, the flow is turbulent, providing for better gas-solid interaction and higher conversion efficiencies. Beyond the entrance section of the channel, the flow quickly becomes laminar, and the gas-solid interaction is not as efficient. It is known in the art to use segmented monoliths in order to improve the monolith mass transfer characteristics.

Monoliths may also be machined out of metal. Metal substrates are conventionally made by spiral-winding a corrugated metal strip into a coil with the corrugations running parallel to the longitudinal axis of the coil to provide a plurality of fine, parallel gas flow passages extending through the metal substrate. The cross-section of the passages may be triangular, circular, square, rectangular, etc. The coil is stabilized to prevent "telescoping" of the spiral-wound metal strips by the utilization of pins or other mechanical fasteners driven through the coil or by brazing or spot or resistance welding the wound metal strip layers to each other. Such brazing or welding may take place either at one or both end faces, throughout the body, or at selected portions of the body, as is well known in the art. The limitations mentioned above for straight-channel ceramic monoliths apply also to metal monoliths with straight channels.

An alternative to a straight-channel monolith is a metal core 22 composed of a plurality of fins 31. The fins 31 may be arranged in an axial succession of adjacent rows 30, with the fins 31 preferably having a corrugated configuration of generally rectangular profile. The fins 31 of each row 30 may be laterally staggered or offset relative to the fins 30 at the adjacent leading and trailing sides. Each fin 31 element may have layers coated on them, as discussed above. This construction provides a large plurality of small tortuous air flow paths 32 extending axially through the converter core 22 to achieve intimate mass transfer between the incoming compressed air 11 stream and the first active material 28 or the first active metal 28 combined with second active material 25 which act as catalysts. The efficient decomposition of ozone or ozone and hydrocarbons in the flow compressed air 11 stream is accomplished with relatively minimal pressure drop across the converter core 22. Therefore, the construction with a plurality of small air flow paths 32 eliminates the need to create a turbulent flow, as may be desirable with monolithic supports. A core with a plurality of fins will have higher conversion efficiency than a monolith core of the same dimensions. Or, the core with plurality of fins will be smaller than a monolith core for the same conversion efficiency.

The substrate forms a core 22 that allows the compressed air 11, which may be bleed air, to flow through and contact the washcoat layer 26 and the active metal or metal oxide 28 and active metal 25 on the substrate which forms the core 22. The bleed air may have a flow between 1 and 250 lbs air flow/min at a pressure between 10 and 50 psia, and space velocities of 15,000 and 1,000,000 hr−1. According to the preferred embodiment, as depicted in FIG. 1A, the system according to the present invention may be installed after the valve 40 so that both the main engine stream 61 from main engine 42 and auxiliary power unit (APU) air 51 from APU 44 can be cleaned.

Alternatively, the core 22 may be located somewhere along the airplane's APU bleed duct and will remove hydrocarbons ingested by the APU 44, typically when it is operating on the ground. However, it will not treat the main engine bleed stream, so any atmospheric ozone in the bleed will not be converted. Because of this, it is envisioned that the washcoat layer 26, the active metal oxide 28, and the active metal 25 may be applied to existing equipment, such as a pre-cooler 13 in order to treat the main engine bleed 61.

Figure 4:
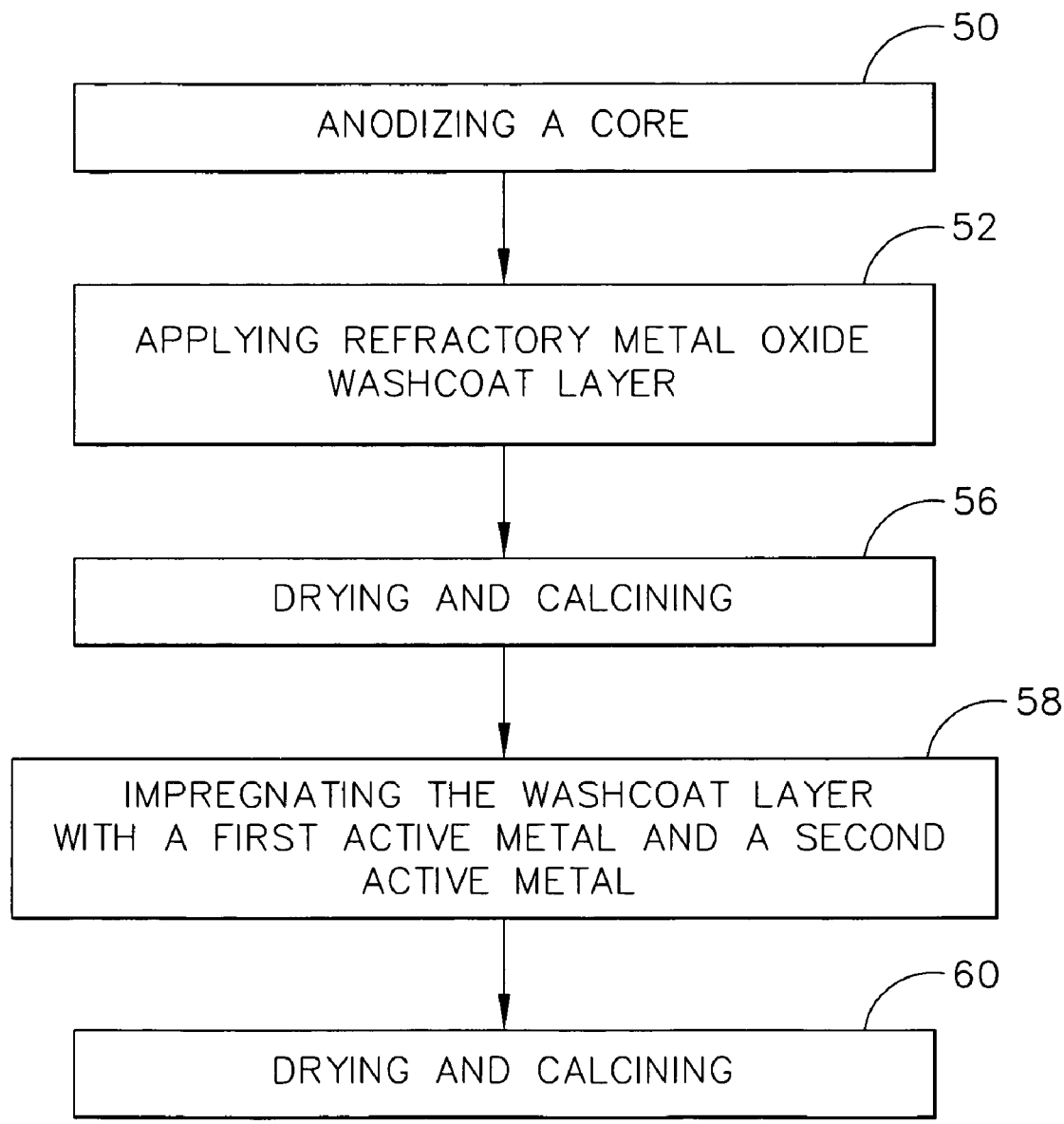
FIG. 4 depicts a flowchart of a method of preparing a catalytic converter according to the present invention.

The present invention also envisions a method of preparing a catalytic converter 18, so as to provide a combined hydrocarbon-destroying and ozone-destroying catalytic converter 18 for an airplane bleed system as in the present invention. The method is shown in FIG. 4. A core 22 is selected, preferably made of aluminum. A step 50 of anodizing the core 22 may be performed. Alternatively, and especially when the metal is not aluminum, the surface of the core 22 may be treated thermally to create a thin oxide surface layer, chemically with strong base or acid, or mechanically by roughening. The step 52 includes applying a refractory metal oxide washcoat layer 26 to the core 22. The washcoat layer 26 may be created by forming a slurry of a refractory metal oxide such as alumina and a synthetic liquid resin containing silicones, siloxanes, and organic solvents, applying the slurry to the anodized surface layer portion 24, blowing excess slurry from the core channels, heating, curing, and calcining to form the washcoat layer 26 on the channel surface.

The slurry may be applied by dipping the anodized core into the washcoat slurry, which will form the washcoat layer 26, so that the surfaces of the fine gas flow passages of the core 22 are completely coated by the washcoat slurry. Alternatively, washcoat slurry may be applied by drawing the washcoat slurry through fine gas flow panels in the core 22 by suction. Excess slurry may be blown out of the gas flow channels within the core 22 with compressed air. The step 56 may be drying in air, and then calcining in air at a temperature of about 300° C. to 600° C. for a period of from about one-quarter to two hours, in order to fix the washcoat 26 to the anodized surface layer 24. The washcoat may be applied by performing these steps once or several times each. The washcoat layer 26 may have a surface area of at least 20 m$^2$/g (surface area of washcoat in square meters per weight of washcoat in grams) and preferably greater than 150 m$^2$/g.

Next, a step 58 of impregnating the washcoat layer 26 with a first active metal 28 and a second active metal 25 may be performed. The active metal 28 has a high efficiency for the conversion of ozone to oxygen. The metal 28 may be selected from the group consisting of manganese, cobalt, palladium, copper, silver, iron, nickel or any combinations thereof. The active metal 25 has a high efficiency for the conversion of hydrocarbons to carbon dioxide and water. The metal 25 may be selected from the group consisting of platinum, gold, iridium, rhodium, manganese, copper, iron, nickel or any combination thereof. Alternatively, the step 58 may be accomplished by impregnating the first active metal separately from the second active metal. Whichever way is chosen, step 58 may be performed once or a number of times until the desired loading is achieved. Next, step 60 may comprise drying and calcining the core 22.

Figure 5:
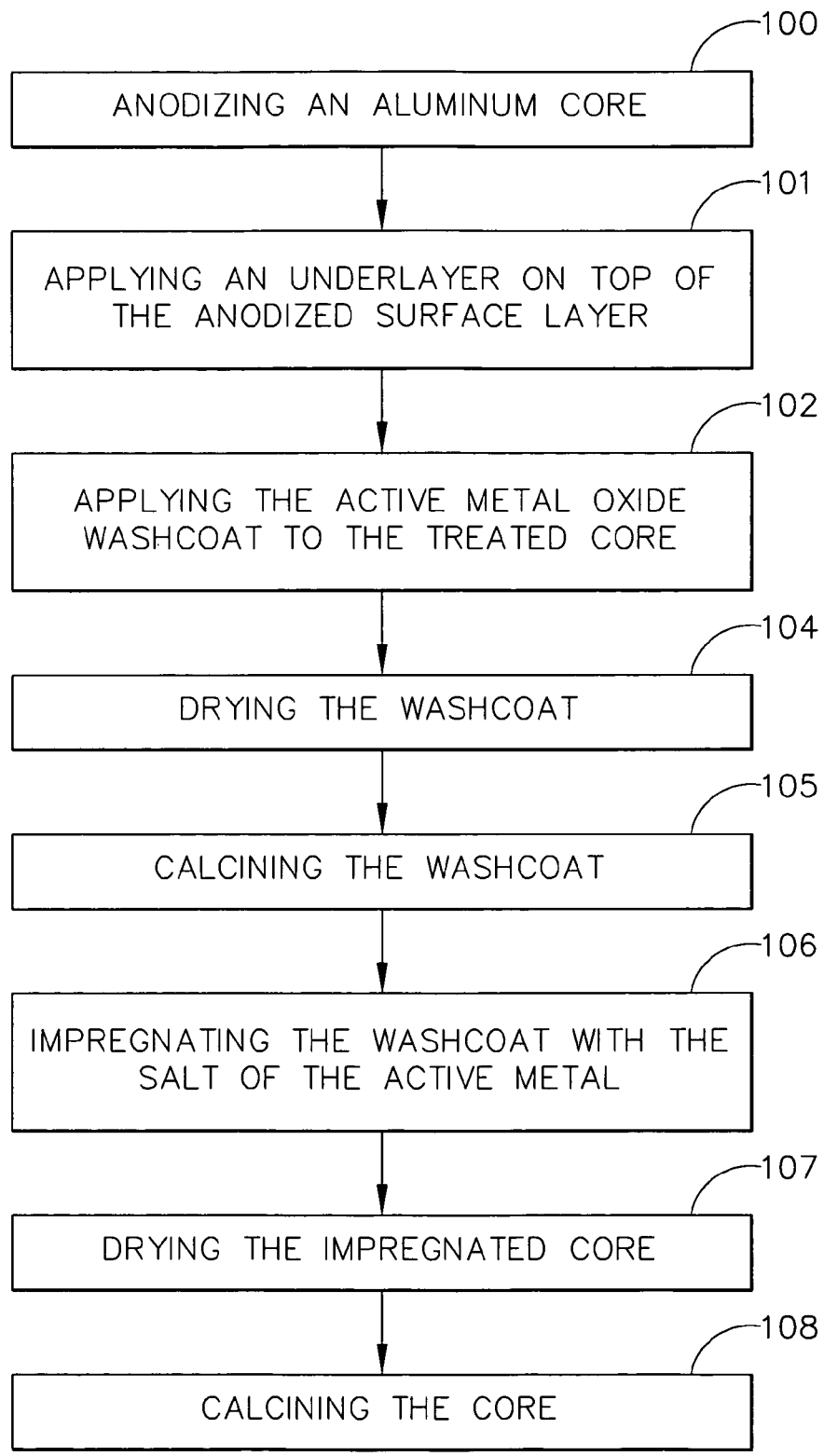
FIG. 5 depicts a flowchart of a method of preparing a catalytic converter.

FIG. 5 depicts another method of preparing a catalytic converter. A core is coated with an active metal oxide washcoat and impregnated with a catalytic metal in order to provide a combined hydrocarbon-destroying and ozone-destroying converter for an airplane bleed system. In a preferred embodiment, the core is aluminum, and the surface is treated to provide greater adhesion of the washcoat. The method comprises a step 100 anodizing an aluminum core. Next, an optional step 101 is applying an underlayer on top of the anodized surface layer. The underlayer may be a refractory metal oxide such as alumina. The washcoat may be applied to the treated core in step 102 by contacting a portion of the catalytic converter with a slurry of an active metal oxide and a synthetic silicone resin. The active metal oxide is active for the conversion of ozone. According to one embodiment, the slurry may form the washcoat layer 26 and may contain manganese oxide or cobalt oxide so that there is 0.5 to 2.5 g washcoat per cubic inch of core. The washcoat is dried in step 104 and calcined in step 105. Next, the active metal for hydrocarbon conversion is applied to the converter. This may comprise a step 106 of impregnating the washcoat with the salt of the active metal and a step 107 of drying the impregnated core. The anodized surface layer 24 provides a corrosion barrier that prevents the active metal salt solution from attacking the core 22 causing corrosion. During fabrication of the catalytic converter 18, the anodized surface layer 24 allows the washcoated core to be fully dipped into a bath containing a solution of the salt of the active metal. Next, a step 108 of calcining to decompose the precursor and produce the active metal may be undertaken. Calcining is well known within the art, and is the process of heating a substance to a high temperature that is below the melting or fusing point, causing loss of moisture, decomposition of the metal salt, and reduction or oxidation. The active metal 25 thus impregnated may have a high efficiency for the conversion of hydrocarbons to carbon dioxide and water and be selected from the group consisting of platinum, gold, iridium, rhodium, manganese, copper, iron, nickel or any combination thereof. In one embodiment, platinum is the preferred metal and may be applied by impregnation with a platinum salt, including platinum nitrate or platinum sulfite acid. The platinum may be present at 0.5-15% by weight of the washcoat.

Figure 6:
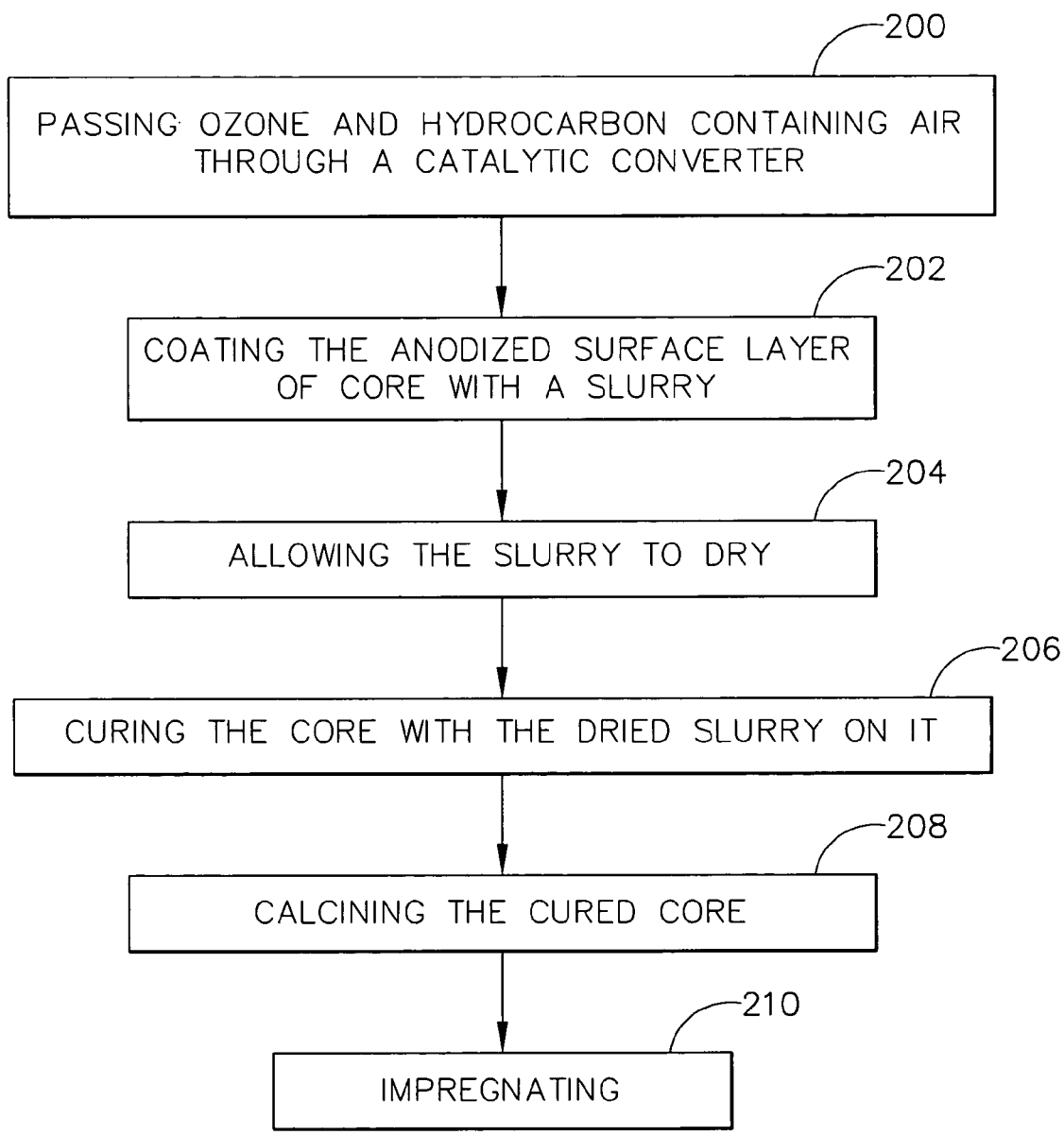
FIG. 6 depicts a method of destroying ozone and hydrocarbons in airplane bleed air.

According to another embodiment, as shown in FIG. 6, a method of destroying ozone and hydrocarbons in airplane bleed air is disclosed comprising a step 200 of passing ozone and hydrocarbon containing air through a catalytic converter. The converter core may be a ceramic monolith, or be composed of a plurality of fins enclosed by a shell, or layers of fins stacked in an alternating manner to form a heat exchanger. In a preferred embodiment, the core is aluminum and has an anodized surface layer portion. A washcoat may be formed on the anodized surface layer portion by a step 202 of coating the anodized surface layer with a slurry of aluminum oxide and allowing to dry. This may be accomplished according to any known methods including dipping the core, or a portion of the core, into the slurry, and air knifing processes as known within the art. The slurry may also contain a silicone resin. A step 204 of allowing the slurry to dry may be followed. Next, the method comprises a step 206 of curing the core with the dried slurry on it and a step 208 of calcining the cured core. Calcination may be performed between two and ten hours at temperatures about 500 degrees Celsius. The preferred temperature range may be between 200° C. and 600° C. During calcination, the organic material in the washcoat layer 26 is burned off. Also, the chemical bonds cross-linked during the curing stage are transformed into a three-dimensional network of chemical bonds. The metal oxide in the anodized surface layer may be bridged with the metal oxide in the washcoat layer 26 through this network of bonds. After washcoat calcination has been completed, the aluminum oxide may then be impregnated in a step 210 with a cobalt salt or oxide in any amount up to 100% by weight of the aluminum oxide, and a platinum salt in the amount of 0.5-15% by weight of the cobalt oxide, provided that there is 50-400 g Pt/ft$^3$ of converter present.

The invention is not limited to the specific embodiments above and envisions a multitude of different methods and systems. By way of example, the washcoat may be disposed on the substrate (or portion of the core), dried, cured, activated, and then impregnated with the active metal or metals. According to another embodiment, the active metal or metals may be combined with the washcoat material prior to disposing on the substrate.

It is contemplated that while many of the examples and methods are described for the combined ozone and hydrocarbon destroying system, they may be applied to the ozone destroying system of the present invention as well. In one embodiment, the active metal oxide washcoat for destroying ozone may be applied in the same manner without, however, the active metal for destroying hydrocarbons impregnated into the active metal oxide. In an alternate embodiment, the ozone destroying system may comprise the refractory metal oxide washcoat and the first active metal for destroying ozone, where the first active metal is impregnated into the refractory metal oxide washcoat and where the first active metal is a transition metal. However, the ozone destroying system may lack the second active metal which destroys hydrocarbons.

It should be understood, of course, that the foregoing relates to preferred embodiments of the invention and that modifications may be made without departing from the spirit and scope of the invention as set forth in the following claims.

We claim:

1. An ozone destroying system consisting of:
   a core;
   an active metal oxide washcoat layer applied to said core
   a first active metal impregnated in the washcoat layer;
   a second active metal impregnated in the washcoat layer;
   wherein said active metal oxide washcoat layer comprises an oxide of a metal, wherein the metal is copper, iron, cobalt, nickel or a combination thereof;
   wherein the first active metal is selected from the group consisting of manganese, palladium, copper, silver, iron, cobalt and nickel or a combination thereof; and
   wherein the second active metal is selected from the group consisting of platinum, gold, iridium, rhodium, manganese, copper, iron, nickel or a combination thereof.

2. The system of claim 1 wherein said oxide of a metal is cobalt oxide.

3. The system of claim 1 wherein said core is a heat exchanger.

4. The system of claim 1 wherein a surface of said core is treated by mechanical means, chemical means, electrochemical means, thermal means or a combination thereof.

5. The system of claim 1 wherein said core comprises an anodized surface layer.

6. The system of claim 1 wherein said washcoat layer has a surface area of at least 20 m$^2$/g.

7. The system of claim 1 wherein said core is a metal core comprised of a plurality of fins.

8. The system of claim 1 wherein said system destroys ozone from airplane bleed air at a flow rate of from about 1 to about 250 lbs air flow/min.

9. An ozone destroying system consisting of:
   a core;
   an active metal oxide washcoat layer applied to said core that destroys ozone; and
   wherein said active metal oxide washcoat layer comprises copper, iron, cobalt, nickel or a combination thereof.

10. The system of claim 9 wherein said active metal oxide washcoat layer comprises manganese oxide, cobalt oxide or a combination thereof.

11. The system of claim 9 wherein said core is a heat exchanger.

12. The system of claim 9 wherein said core is aluminum and comprises an anodized surface layer.

13. An ozone destroying system consisting of:
   a core;
   a refractory metal oxide washcoat layer applied to said core; and
   an active metal impregnated in said washcoat layer, wherein said active metal is platinum; and
   wherein said refractory metal oxide is cobalt oxide.

14. The system of claim 13 wherein said active metal is loaded at up to 100% by weight of said washcoat.

15. The system of claim 13 wherein said core is a heat exchanger.

16. The system of claim 13 wherein said core comprises an anodized surface layer.

17. The system of claim 13 wherein said system destroys ozone in a temperature range of from about 50° F. to about 500° F.

* * * * *

UNITED STATES PATENT AND TRADEMARK OFFICE
CERTIFICATE OF CORRECTION

PATENT NO. : 7,629,290 B2　　　　　　　　　　　　　　　　　　　　　　　　Page 1 of 1
APPLICATION NO. : 11/286108
DATED : December 8, 2009
INVENTOR(S) : Michalakos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1050 days.

Signed and Sealed this

Second Day of November, 2010

David J. Kappos
*Director of the United States Patent and Trademark Office*